US012708112B2

(12) United States Patent
Middleton

(10) Patent No.: US 12,708,112 B2
(45) Date of Patent: Aug. 18, 2026

(54) COLLAPSIBLE MOUNTED HUNTING BLIND

(71) Applicant: 850 Plus, LLC, Cantonment, AL (US)

(72) Inventor: Jake Middleton, Cantonment, FL (US)

(73) Assignee: 850 Plus, LLC, Cantonment, AL (US)

( * ) Notice: Subject to any disclaimer, the term of this patent is extended or adjusted under 35 U.S.C. 154(b) by 0 days.

(21) Appl. No.: 19/213,879

(22) Filed: May 20, 2025

(65) Prior Publication Data

US 2025/0351815 A1 Nov. 20, 2025

Related U.S. Application Data

(60) Provisional application No. 63/649,519, filed on May 20, 2024.

(51) Int. Cl.
*A01M 31/02* (2006.01)
*B63B 17/02* (2006.01)

(52) U.S. Cl.
CPC ........... *A01M 31/025* (2013.01); *B63B 17/02* (2013.01)

(58) Field of Classification Search
CPC ............................ A01M 31/025; B63B 17/02
See application file for complete search history.

(56) References Cited

U.S. PATENT DOCUMENTS 4,106,145 A * 8/1978 Gillen .................. A01M 31/00 135/901
4,723,371 A * 2/1988 Williams ............ A01M 31/025 135/901
5,842,495 A * 12/1998 Egnew .................... E04H 15/38 135/147
7,424,862 B1 * 9/2008 Wagner .................. B63B 17/02 114/364
8,757,185 B1 * 6/2014 Muzzio .................. B63B 17/02 114/361
9,717,233 B1 * 8/2017 McCauley ............ A47C 17/70
2011/0180119 A1 * 7/2011 Clampitt ................ E04H 15/34 135/121
2019/0322336 A1 * 10/2019 Muzzio .................. B63B 17/02
2021/0147036 A1 * 5/2021 Muzzio .................. B63B 83/00
2022/0396334 A1 * 12/2022 McKellar ............ A01M 31/025
2023/0240282 A1 * 8/2023 Wood ................. A01M 31/025 114/361
2025/0296666 A1 * 9/2025 Hsu ........................ B63B 34/20

* cited by examiner

*Primary Examiner* — Richard G Davis
(74) *Attorney, Agent, or Firm* — AdamsIP, LLC; Edward Brinkley Garner, III; James Hunter Adams

(57) ABSTRACT

A kayak mounted hunting blind is provided. The blind comprises a frame, anchors, and a camouflage covering. The frame includes at least two rods that extend along the length of the kayak from anchors attached to a first end to anchors attached to a second end of the kayak. The distance between the anchors is shorter than the length of the rods which requires the rods to be bent outwards away from an interior of the kayak. The rods are held in a raised position by a tensioning cable between the rods. Additional cables connect and pull the rods toward the kayak. The camouflage covering is secured around the hull of the kayak and draped over the frame's rods. When a hunter uses the blind, the hunter's body is beneath the rods and the covering. To exit the blind, the hunter releases the tensioning cable and lowers the frame.

16 Claims, 9 Drawing Sheets

COLLAPSIBLE MOUNTED HUNTING BLIND

CROSS-REFERENCE TO RELATED APPLICATIONS

This application claims the benefit of U.S. Provisional Application No. 63/649,519, filed on May 20, 2024, wherein said application is incorporated herein in its entirety by reference.

FIELD OF INVENTION

The subject matter of the present disclosure refers generally to collapsible mounted hunting blinds.

BACKGROUND

Duck hunting requires hunters to remain stationary in wetlands for long periods of time. The hunters must remain hidden for long enough to allow a flock of birds to gather and land on the water. Once the ducks have gathered on the water, the hunter must then quickly shoulder their firearm and shoot before the ducks are able to fly away. Traditionally, hunters have used different types and styles of blinds to assist with remaining hidden from their quarry until the right time. These blinds include both static blinds, such as tents or covered mats, and mobile blinds, such as boats and, more recently, kayak mounted hunting blinds.

With respect to kayak mounted blinds, hunters will remain seated in a kayak while partially covered in camouflage, having at least their heads exposed. The hunters' heads are exposed to allow them to see the water, along with anything landing on the water, and remove the camouflage to shoulder their guns, aim, and shoot. When the time is right, the hunter will quickly uncover himself, shoulder the firearm, aim, and shoot. As the ducks will quickly flee in response to the hunter's sudden movement, the above motion must be quick and fluid. If the hunter takes too long between uncovering and shooting, the ducks may be out of range or too dispersed for a shotgun to be effective.

As the hunter's head is exposed, the ducks can see the hunter and may avoid the area if the hunter moves or otherwise draws attention to himself. Further, any movements the hunter makes while waiting for ducks to land and flock on the water can spook the birds and cause them to leave prematurely. This can lead to a wasted day of hunting during an already short hunting season. Additionally, duck hunting is primarily performed during the early morning in the fall and requires hunters to be out on the water while stationary. Therefore, it can quickly become very cold and it is well known that the head is one of the primary points of heat loss in the human body.

Accordingly, there is a need in the art for a quick opening, full body coverage, kayak mounted hunting blind system.

SUMMARY

A collapsible mounted hunting blind system is provided. In one aspect, the system leverages flexible rods and a camouflage covering to address the challenge of concealment in wetland hunting environments, a persistent problem that limits the effectiveness of traditional blinds when pursuing waterfowl. In another aspect, the system uses carefully selected tensioning members to enhance stability while maintaining quick deployment capabilities. In another aspect, the blind is designed to integrate with existing watercraft and hunting equipment in a way that requires minimal modification of said existing gear. Generally, the hunting blind system of the present disclosure is designed to enhance existing hunting setups in a way that allows for improved concealment and rapid access while preserving the mobility and functionality of the watercraft to which it is mounted.

The frame is comprised of rods and anchors and extends along and over the central volume of the kayak where the user sits. There are at least two rods that cross at both the front and rear ends of the kayak. The rods of the frame are flexible and are bowed outwards, away from the center of the kayak, while maintaining their form and supporting the weight of the camouflage covering. The rods are attached to the anchors by a connection having at least two degrees of freedom. The rods may rotate around the anchor and may also rotate about a horizontal axis extending through the anchor. Additionally, some embodiments contain tensioning members connecting the rods to the kayak. The tensioning members can provide a pulling force to pull the rods towards the floor of the kayak. This pulling force ensures that the rods will quickly descend to the ground without any action by the user. An additional tensioning member can extend between the rods and provide a resistive force that holds the rods in the raised position until the hunter releases the additional tensioning member. This allows the hunter to quickly lower the frame and the camouflage when the hunter desires to exit the blind to shoot without concern for damaging the blind.

The covering is comprised of at least two sections. The first section extends around the kayak body and conceals the sidewalls and can cover at least a portion of the kayak's open top. The second section extends upwards from one side of the kayak and is configured to extend across the frame to the other side of the frame from which it extends, covering the contents of the kayak, including the hunter and overlaps by at least 6 inches on the other side. The camouflage covering may include various features. In some embodiments, the covering is mesh and only serves to provide the hunter with a cover and prevent the prey noticing the hunter. In other embodiments, the camouflage can include heavier, thermal insulation to keep the hunter warmer in cold environments. Further, the camouflage may include various loops or straps to allow leaves, sticks, reeds, and other vegetation or materials from the area to be incorporated into the camouflage. Using the natural vegetation and materials from the surrounding area will help to further conceal the kayak and the hunter within from the hunter's prey.

In one preferred embodiment, the camouflage covering is attached to the rods of the frame by snaps and ties. This attachment method allows for quick assembly and disassembly of the blind when transporting the kayak and blind. By removing the camouflage covering, the hunter can use traditional kayak transportation methods, such as a trailer or a vehicle roof rack, without fear of the camouflage covering blowing away during travel. In another preferred embodiment the rods of the frame extend through tunnels along the perimeter of the camouflage covering. This ensures that the rods are securely connected to the covering and that the camouflage moves with the rods when the rods are raised or lowered. In some embodiments, the covering includes openings near the rods to allow the tensioning members to connect to the rods within the covering.

To exit the blind, the hunter simply releases the tensioning mechanism, throws the second section of covering towards the side it extends from, and is then free to shoulder their firearm unobstructed. This setup allows for a simple, quick, and fluid exit so that there is minimal time for the prey to flee before the hunter shoulders the firearm and takes aim. Additionally, due to the frame extending over the hunter's head, the hunter may adjust their position within the kayak, reload or check their firearm, fidget, and look around without concern of spooking the prey before the hunter is ready to exit the blind.

In other preferred embodiments, the hunting blind may be secured to the ground rather than a kayak. In these embodiments, the rods of the blind are secured to solid rectangular sheets of material. These sheets can include attachable spikes on opposite sides of the sheet to ensure a secure attachment. Further, in some embodiments, the sheet is bifurcated into two sides, each side having a spike, connected by a hinge such that the mount may be used on flat or uneven terrain. As with the above-described embodiments, the rods of the blind are inserted into an anchor such that the rods are bent outwards and define a volume between the rods and the surface below the rods.

In a preferred embodiment of the invention when secured to the ground, the covering is attached to the frame in the same way as described in the other embodiments. Preferably, the rods of the frame are inserted into a tunnel or tube along the covering. When the rods are then inserted into the anchors, the covering is secured to the rods. As with the other embodiments, the covering will then be held by the frame and fall with the frame when the tensioning member is released. The ground embodiment may further include flaps or extensions in the covering to allow the covering to be secured to the ground in addition to the rods of the frame. These flaps may include preformed holes or openings to allow an anchor or other securing mechanism to be inserted into the ground through the opening. The holes may additionally have grommets or other reinforcements to increase strength and prevent tears or rips.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

BRIEF DESCRIPTION OF FIGURES

These and other features, aspects, and advantages of the present disclosure will become better understood with regard to the following description, appended claims, and accompanying drawings where:

DETAILED DESCRIPTION

In the Summary above and in this Detailed Description, the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). In a preferred embodiment, appropriate attachment bases include but are not limited to one of a water recreation vehicle, chair, or plate. Water recreation vehicles may include, but are not limited to, kayaks, canoes, motor boats, jet skis, rafts, paddle boards, and other flotation devices. In a preferred embodiment, chairs may include, but are not limited to, zero gravity chairs. In another preferred embodiment, plates may include, but are not limited to, multi-segment plates, expandable plates, buoyant plates, and plates anchored to the ground.

Figure 1:
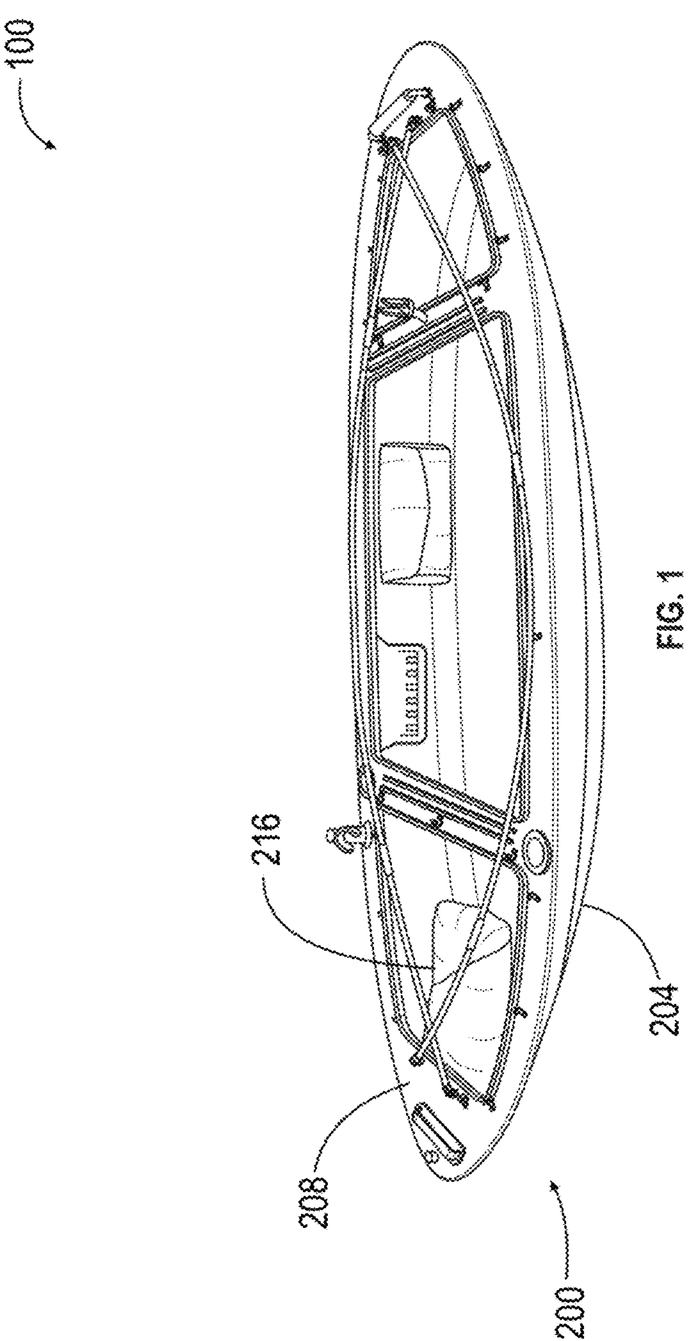
FIG. 1 shows an embodiment of kayak mounted hunting blind without a camouflage covering embodying features consistent with the principles of the present disclosure.

The system of the present invention generally comprises a mounted blind appropriate for hunting that is affixed transiently or permanently to an attachment base. FIG. 1 illustrates a preferred embodiment of the system 100 generally comprising a kayak 200 having a frame 300 thereon. The kayak 200 includes a hull 204 and a deck 208. The hull and deck define an inner volume 212 in which a hunter can sit, and which may be used to store equipment or other items. The kayak can include a seat 216 and may also include a rear compartment 220 behind the seat. Although hunting kayaks are generally 10-12 feet in length, the disclosed embodiment is contemplated for use with any kayak. Kayaks are generally comprised of plastic or composite material, but can be formed from metal, wood, plexiglass, fiberglass, or any other watertight, rigid material. Further, although the depicted embodiment is shown as being used on a kayak, the disclosed hunting blind may be used on any small vessel or flat surface that provides protection from water and is strong enough to withstand the forces generated by the tensioning members of the frame.

The frame 300 is comprised of a plurality of flexible rods 304. The rods 304 are flexible enough that they can be bent across and over the internal volume 212 of the kayak. As such, the rods 304 are longer than the kayak's top opening. Although longer than the top opening, in some embodiments, the rods are shorter that the length of the kayak's external hull. In some embodiments, the rods 304 are approximately 9 feet in length. In some embodiments, such as the one shown in FIG. 1, the rods 304 are formed from a plurality of smaller rods 308 and rod connectors 312. The ends of the smaller rods 308 are inserted into the open ends of the tube-like connectors 312 to form the larger rods 304. In some embodiments, the open ends of the connectors 312 are the same size or slightly smaller than the rods, creating a stretch or press-fit connection. In other preferred embodiments, the connectors 312 contain a snap or locking feature to secure the ends of the smaller rods 308 within the connector. In still further embodiments, the open ends of the connectors 312 are sized to secure the smaller rods 308 within the open ends of the connectors 312 wherein the smaller rods 308 are held in place by the forces created by the bend of the overall rod 304. In still further embodiments, the smaller rods 308 are connected by an internal string or cable that holds the smaller rods 308 and connectors 312 together, such as the rods used in tents. The rods 304 can thereby be disassembled into the smaller rods 308 and connectors 312 for easy transport. The frame can be quickly taken down from the kayak and contained within a small volume.

In some embodiments, the rods 304 are made from carbon fiber, plastic, wood, polymer, or metal. The connectors 312 may be made from plastic, rubber, metal, wood, carbon fiber, polymer, silicone, or any other suitable material. However, any composition of rod 304, 308 and connector 312 that allows for some flexibility while maintaining enough rigidity and strength to support the covering 500 and withstand the forces created by the tensioning members may be used without deviating from the disclosure.

Figure 5:
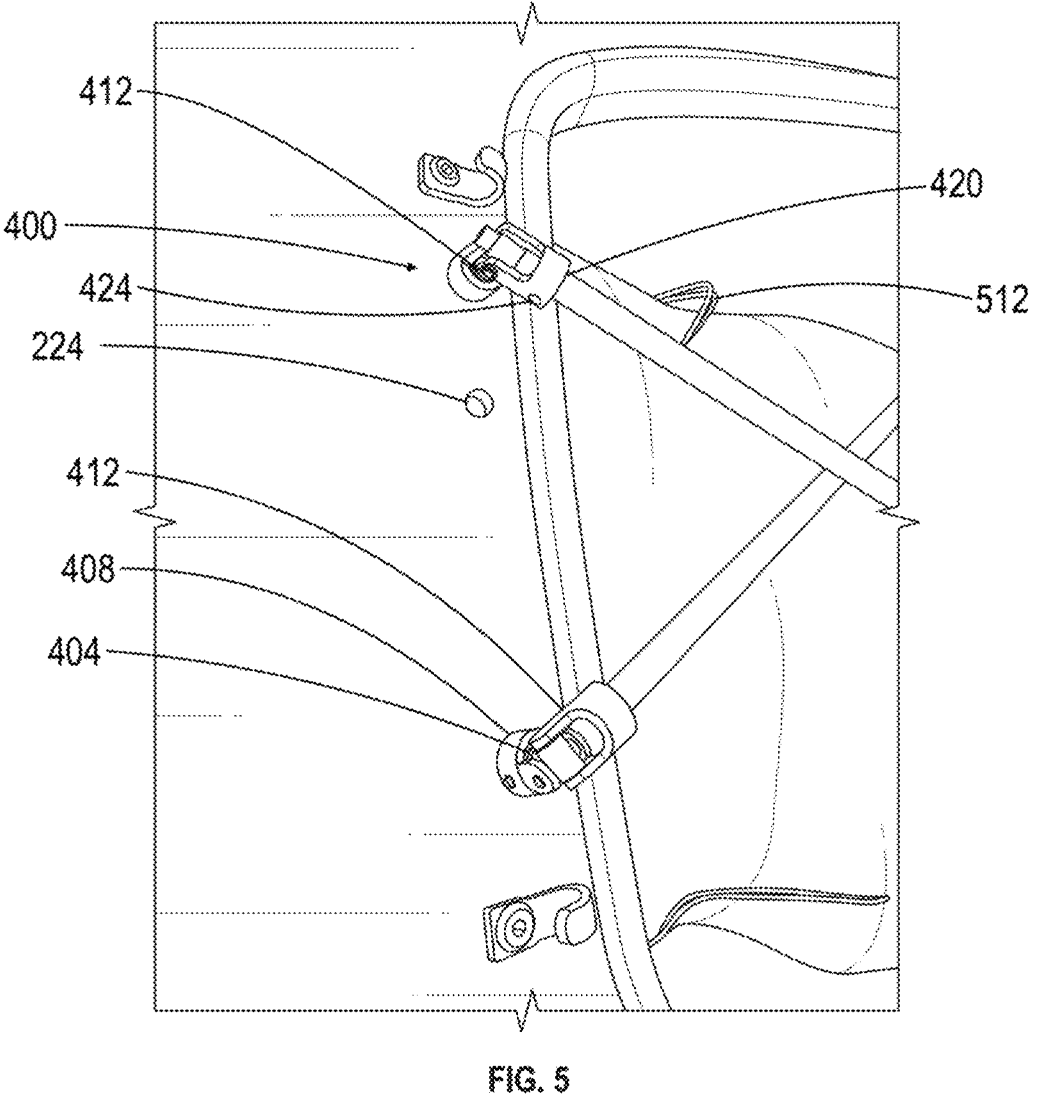
FIG. 5 shows an embodiment of the frame anchors mounting the frame of the blinds to the kayak body.

As shown in FIGS. 1 and 5, the rods 304 are attached to the front end and rear end of the perimeter of the kayak's deck 208 by anchors 400. The rods and anchors are configured such that when the rods are in a lowered configuration, a first rod 304A and a second rod 304B are crossed over each other at both a front and rear end of the kayak. This layout allows the bent rods to be fully contained within the area of the kayak without overhanging the hull when lowered. The rods 304 can be rotated upwards into a raised configuration in which the rods extend upwards and above the interior volume 212 of the kayak in a bowed, crescent, or bent shape. The rods 304 remain crossed at both the rear end and the front end when in the raised position, when in the lowered position, and while transitioning from the raised to the lowered position. This configuration ensures that the system stays within the area of the kayak 200. Further, as will be described below, this crossed configuration ensures that the rods 304, and the camouflage covering 500, fall straight down when the hunter releases the tensioning mechanism, rather than falling inwards towards the opposite side of the kayak.

The anchors 400 play a crucial role in securing the frame of the hunting blind to the kayak deck 208. These anchors are designed to provide a stable yet flexible connection point for the flexible rods that form the structure of the blind. The attachment method utilizes through holes 224 in the deck, which allow for a secure and permanent installation without compromising the integrity of the kayak. These through holes are strategically placed to optimize the positioning of the blind frame while minimizing interference with other kayak features or the hunter's movements.

The anchor assembly preferably comprises a screw-like body 404, mount 408, and connector 412. The screw-like body 404 serves as the primary attachment point, passing through the deck's through hole 224 and securing the anchor to the kayak. This body is designed to provide a strong and durable connection that can withstand the forces exerted on the blind during use. The mount 408 is attached over the body 404, creating a stable platform for the connector. This mount may be shaped to distribute load evenly and prevent damage to the kayak deck. The connector 412 is rotatably attached to the mount 408, allowing for the necessary range of motion required by the flexible rods of the blind frame. To ensure the anchor remains securely in place, a washer or nut is placed over the opposite end of the body 404. This additional component serves multiple purposes in the anchor assembly. It prevents the body from pulling through the through hole 224, distributes the load over a wider area of the kayak's interior surface, and allows for adjustment of the anchor's tension. The use of a washer or nut also facilitates easy installation and removal of the anchor if necessary, providing flexibility for maintenance or replacement. This secure yet adjustable attachment method ensures that the anchors can reliably support the blind structure while allowing for the dynamic movements required during hunting activities.

The body 404 of the anchor is inserted into the hull of the kayak at the through holes 224. In some embodiments, the body 404 may be threaded and be screwed into the deck 208, thereby creating the through hole 224. In other embodiments, the body 404 functions like a bolt having a wider head and a nut or other securing feature that prevents the body 404 from exiting the hole 224 when pulled. In preferred embodiments, the bodies 404 of the anchors are placed in holes that are premade in the kayak, such that the user does not need to create the holes. This prevents a user from damaging or marring the material of the kayak in order to install the system 100. Further, this attachment allows for effectively limitless re-attachment as no screw threads interface with the material of the kayak, which material could become eroded and wear away with continued insertion and removal of a screw into the material of the kayak.

The mount 408 of the anchors 400 is designed to interface securely with the body 404, providing a stable foundation for the rest of the anchor assembly. The connection between the mount 408 and the body 404 is achieved through a tightening pin or similar securing feature, ensuring a robust and reliable attachment. This method of connection allows for precise adjustment during installation, enabling the hunter to optimize the positioning and tension of the blind frame. In some preferred embodiments of the hunting blind system, the mount 408 is engineered with the ability to rotate about the body 404. This rotational capability extends around the axis of the hole 224, offering a degree of flexibility in the frame's movement. Such a design can be particularly advantageous in situations where the blind needs to adapt to changing conditions or when the hunter requires a greater range of motion. The rotational feature may also assist in the setup and takedown process, allowing for easier alignment of the frame components. However, it's important to note that this rotation is controlled and limited to ensure the overall stability and functionality of the blind structure.

Conversely, other embodiments of the system feature a mount 408 that is firmly secured to the body 404, preventing any rotation around the body. This fixed configuration provides maximum stability and rigidity to the anchor assembly. In these designs, the lack of rotation ensures that the frame maintains a consistent orientation relative to the kayak, which can be crucial for maintaining the blind's shape and concealment effectiveness. The choice between rotational and fixed mounts may depend on factors such as the specific hunting environment, the hunter's preferences, or the particular design requirements of the blind system. Regardless of the mount's rotational capabilities, both designs prioritize the secure attachment of the frame to the kayak, ensuring reliable performance in various hunting scenarios.

The connector 412 is preferably attached to the top portion of the mount 408 using a pin 416, which allows for rotational movement. This rotational capability allows for the frame to be raised and lowered smoothly. The connector's design allows it to rotate about the pin 416, with its open end 420 traveling in an arc over the mount 408. This range of motion ensures that the rod 304 can be positioned at various angles to accommodate different configurations of the blind. The open end 420 of the connector 412 is configured to receive and hold an end of the rod 304. This design feature allows for easy installation and removal of the rods, facilitating quick setup and takedown of the blind. The shape and size of the open end 420 are configured to match the dimensions of the rod 304, ensuring a snug fit that contributes to the overall stability of the frame. To further enhance the security of the connection, the connector 412 may include a tightening element 424. This tightening element is designed to firmly secure the end of the rod 304 within the opening of the open end 420, preventing any unwanted movement or detachment during use. The inclusion of this tightening feature provides hunters with the ability to adjust the tension of the frame as needed, adapting to different environmental conditions or personal preferences.

In some preferred embodiments, the connection between the rod 304 and anchors 400 is designed with versatility and functionality in mind, offering at least two degrees of freedom relative to the kayak 200, allowing the rod to rotate around the axis of the hole in the kayak deck and providing a full range of circular movement. Additionally, the rod can adjust its angle over the mount 408, enabling it to tilt and pivot as needed. These combined movements create a flexible and adaptable connection that significantly enhances the user experience. The at least two degrees of freedom ensure that the frame can be easily manipulated, allowing the hunter to swiftly lower the blind when the opportunity to take a shot arises. This ease of movement is important in hunting scenarios, as it enables the user to transition from a concealed position to shouldering their firearm without any obstructions or delays, potentially making the difference between a successful hunt and a missed opportunity.

Figure 2:
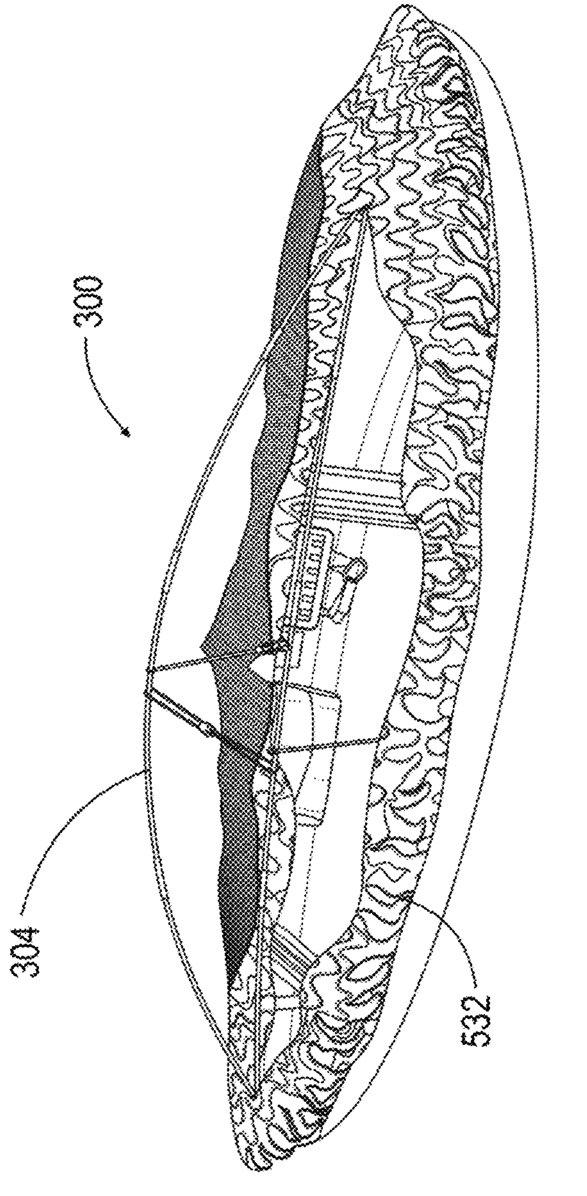
FIG. 2 shows an embodiment of a kayak mounted hunting blind having a camouflage covering in an open configuration and embodying features consistent with the principles of the present disclosure.

As illustrated in FIG. 2, the camouflage covering is configured to envelop the entire exterior of the kayak hull 204, creating a seamless camouflage effect that blends the watercraft into its surroundings. The covering extends beyond just the hull, reaching upwards to cover the internal volume of the kayak that lies beneath the flexible rods 304 of the frame. This design ensures that the hunter and any equipment within the kayak remain hidden from view, even when the blind is in its raised position. The material of the covering is carefully selected to mimic the textures and colors of wetland vegetation, further enhancing its ability to disguise the presence of the hunter in various aquatic environments.

Figure 3:
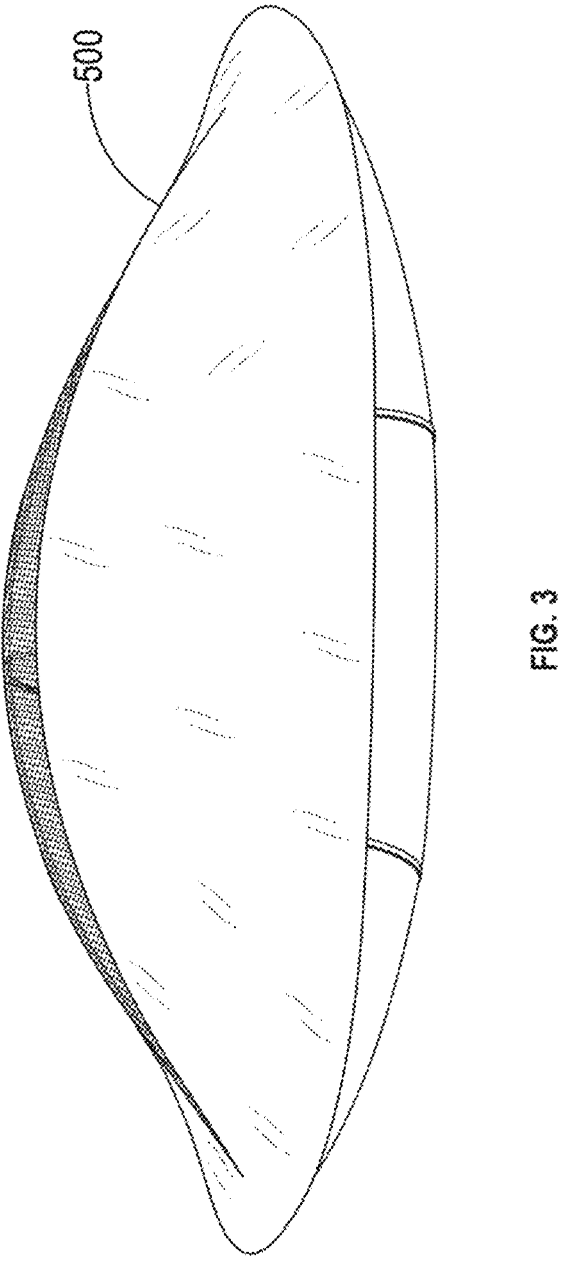
FIG. 3 shows an embodiment of a kayak mounted hunting blind having a user inside and uncovered by the covering.
Figure 6:
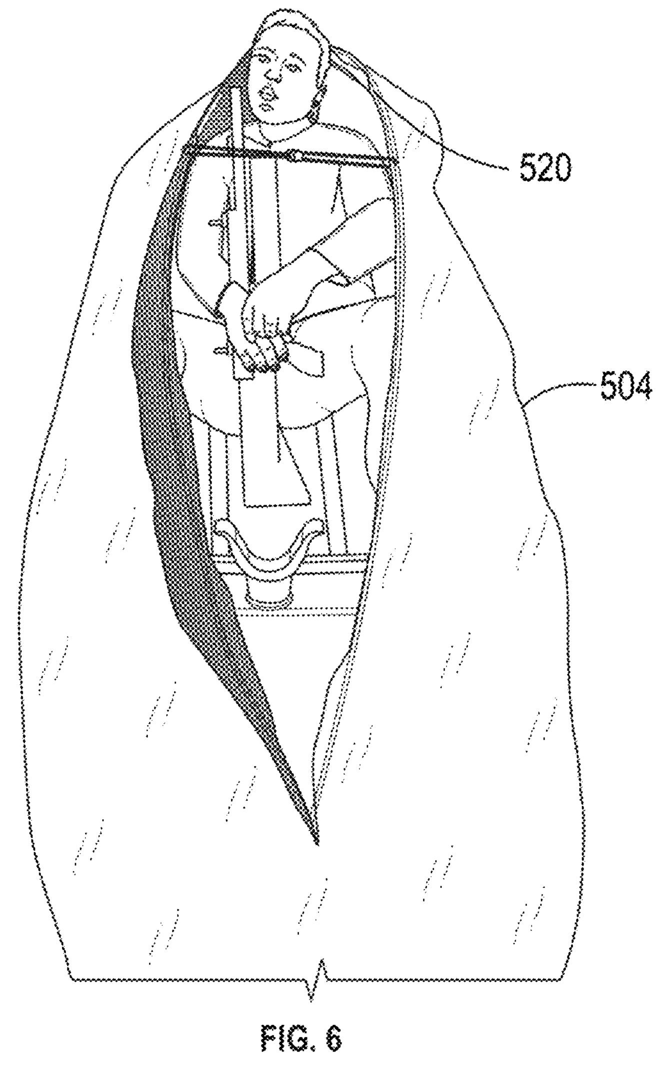
FIG. 6 shows the kayak mounted hunting blind in an open configuration with a hunter inside.

As illustrated in FIG. 3, the covering 500 is preferably attached to the kayak and the frame 300 in a way such that the covering surrounds and camouflages the body of the kayak 200 and the majority of the hunter. A first section 504 of covering 500 is used to cover the body of the kayak 200 and the hunter. Although the FIG. 3 shows clips and ties as the primary attachment mechanism, any selectively removable attachment mechanism known in the art is contemplated without deviating from the subject matter of the disclosure, including, but not limited to, straps, buttons, or other connections known in the art. In other embodiments, the first section 504 may simply surround the body of the kayak 200 without being removably attached to the body of the kayak. Preferably, the camouflage is attached to the frame of the blind by the rods 304 of the frame being inserted through channels or tunnels 520 in the covering. In these tunnel embodiments, as shown in FIG. 6, the vertical tensioning cables 320 can be attached to the camouflage covering 500 by inserting an end of the tensioning member through a hole or slot in the covering. This allows the tensioning members 320 to attach to the pegs on the kayak and span between the two rods supporting the camouflage covering 500.

Figure 4:
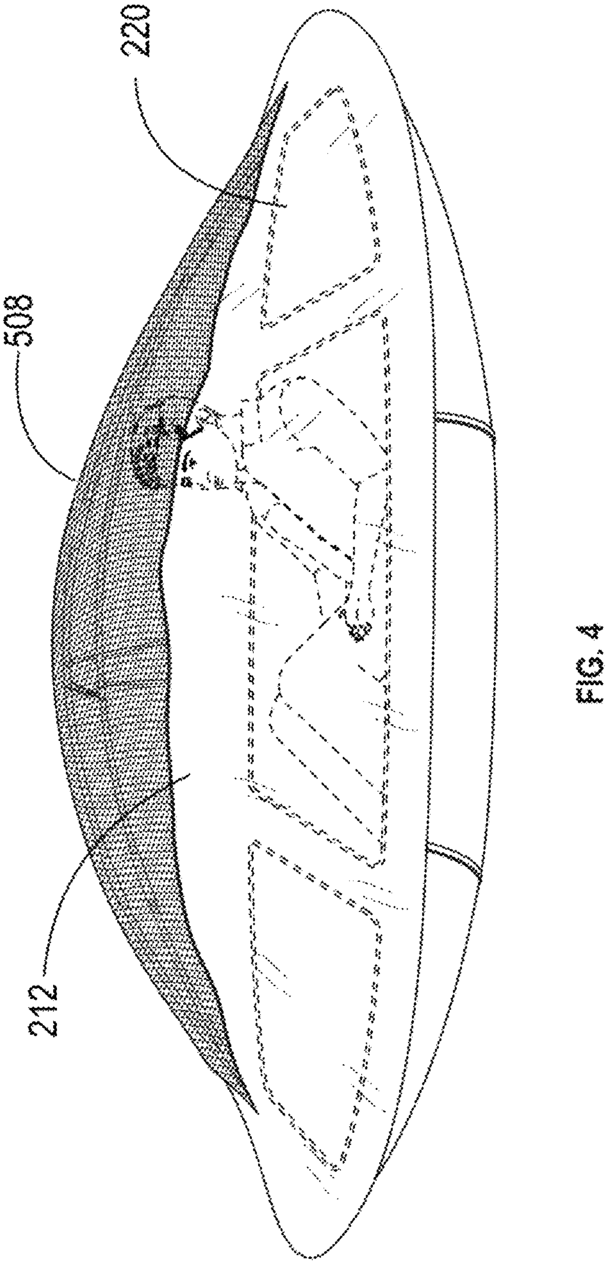
FIG. 4 shows the kayak mounted hunting blind of FIG. 3 with the user completely covered by the camouflage covering.

As shown in FIGS. 4 and 6, a second section 508 of covering preferably extends from one side of the blind and is configured to be draped across the gap between the rods 304 to conceal the opening. FIG. 4 shows both the interior volume of the kayak 200 and the hunter concealed with the blind fully assembled and having the second section of camouflage covering draped over the space between the rods 304. The second section 508 of camouflage covering is designed to extend beyond the gap such that the gap between the rods 304 is fully covered by the second section 508. In a preferred embodiment, the second section 508 is configured to extend at least 6 inches beyond the rod 304 of the opposite side of the kayak. This additional material provides weight and friction to prevent the second section from falling into the gap between the rods 304. Further, the second section 508 can include weights or clips to hold the second section in place over the gap between the rods 304. In some embodiments, the weights are sewn into the fabric of second section 508 near the perimeter of the second section to ensure the ends of the second section do not lift and create a sail like effect that would remove the second section 508 from the gap.

As shown in FIG. 4, the covering 500 is depicted as being composed of a leaf-like camouflage to conceal the hunter and the interior volume of the kayak. The camouflage covering 500 can be made from a mesh or similarly transparent material that allows for one-way visibility. Although a mesh camouflage is shown in the depicted embodiment, any one-way visibility covering can be used without deviating from the substance of the disclosure. In some preferred embodiments, the covering can include loops, straps, or similar attachment means 532 to allow the user to attach natural vegetation, such as reeds, leaves, branches, or other materials to the covering. The natural vegetation assists in concealing the kayak and prevents the kayak from standing out against the natural landscape. In other preferred embodiments, the covering 500 can include a drawstring or other tightening mechanism to secure the excess fabric at the base of the kayak and prevent it from bunching up or becoming tangled in the vegetation. These embodiments can include a toggle or other means known in the art to secure the loose fabric of the covering 500 around the base of the kayak. In yet other preferred embodiments, the covering 500 can be made from different materials at different sections of the covering. For example, in one embodiment, the first portion 504 of the covering can be comprised of a thermal insulating material while the second portion 508 of the covering is comprised of a one-way see through mesh. This configuration allows the hunter to see through the top portion of the covering 500 but allows the hunter to maintain a more comfortable temperature inside the blind. In yet other preferred embodiments, the second portion 508 can be made of a waterproof, transparent sheet having camouflage on top. This waterproof second portion 508 can keep the hunter and interior of the kayak dry during rain or other wet conditions. The described covering features may be combined as desired. Any combination of the above covering materials is contemplated without deviating from the disclosure.

In order to cover the internal volume of the kayak, the rods 304 of the frame 300 are raised from a lowered position shown in FIG. 1 to the raised position shown in FIG. 2. As the rods 304 are longer than the gap between the anchors 400 on each end of the kayak, the rods 304 must bend in order to fit within the open part 420 of the anchor on the front and rear ends. This bend in the rod creates a vertical gap between the center of the rod 304 and the kayak 200 when the rods are in the raised position. This vertical gap defines the concealed volume within the blind. As such, when the camouflage covering 500 is attached to the rods in the raised position, the volume under the covering is concealed by the covering. For example, as shown in FIG. 6, when the rods 304 are in the raised position, the rods are high enough that a user's head can be below the rods 304 when the user is seated in a reclined position in the seat of the kayak 200. As such, the user can be completely covered by the camouflage covering 500 when the second portion of the covering is draped over the gap between the rods 304.

A cord or other tensioning member 320 can be secured to the camouflage covering 500 at a plurality of points to hold the frame 300 in place and support the covering 500 in the raised position. The tensioning member can be made from rubber, fabric, plastic, elastic, or any other suitable material having enough flexibility and strength to provide enough tension to support the rods in the raised position. Further, the tensioning member may be attached to the camouflage covering by ties, clips, sewing, adhesive, or any other securing means known in the art. In some embodiments, the tensioning member is permanently attached to at least one side of the covering 500. The tensioning member 320 is adjusted to provide the desired tension and hold the frame 300 in the desired position. The tension should be enough that the rods 304 are supported and secured in the raised position without being pulled down by the members extending from the kayak to the rods 304.

Figure 7:
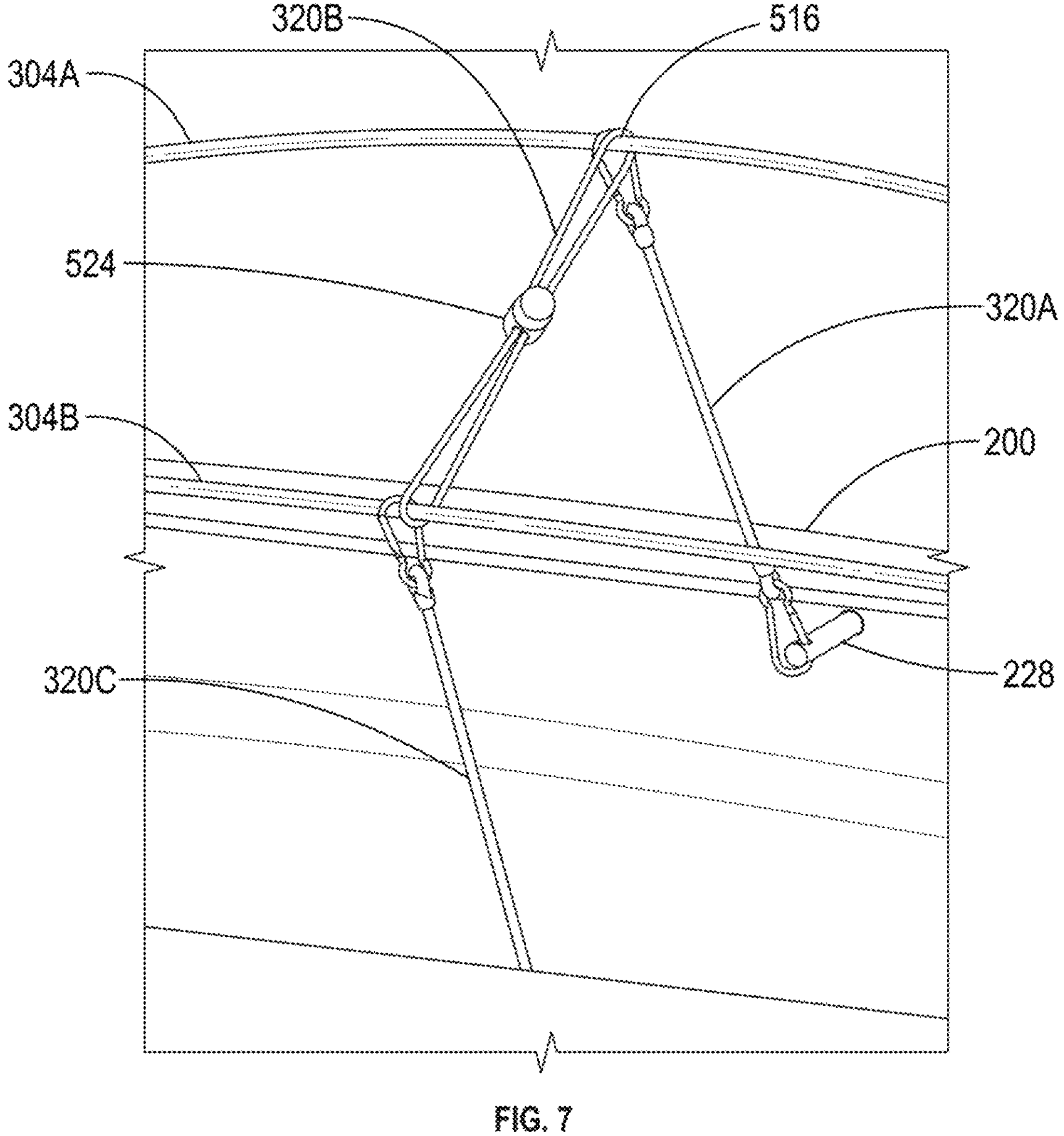
FIG. 7 shows an embodiment of the tensioning mechanism attached to both the rods and the kayak hull, without the camouflage covering.

FIG. 7 illustrates the connections between the tensioning member 320, the rods 304, and the kayak 200, with the camouflage covering intentionally omitted for clarity. While this figure provides a clear view of these connections, it's important to note that in many practical embodiments, the rods 304 are actually inserted into tunnels along the perimeter of the camouflage covering 500. This design allows the covering to move seamlessly with the rods during raising and lowering operations. In such configurations, the tensioning members are often connected directly to the covering 500 rather than to the rods 304 themselves. Consequently, during regular use, both the rods 304 and the frame are typically concealed within the material of the covering 500, creating a more streamlined and camouflaged appearance. This integration of the frame components with the covering enhances the overall effectiveness of the blind system in providing concealment for the hunter.

As shown in FIG. 7, the tensioning member 320 can be attached to the camouflage covering 500 or rod 304 at a first point 516. In some preferred embodiments, the first point 516 is located approximately four and a half feet (4.5 ft) from the front of the kayak opening. The member 320 then attaches to a peg-like anchor 228 that is secured within the perimeter of the kayak's hull 204 within the internal volume of the kayak proximal to the deck at a second point. In some embodiments this peg 228 is positioned approximately 4 feet 8 inches (4.66 ft) from the front of the kayak opening. In some embodiments, the tensioning member wraps around a length of the peg 228 that extends beyond a surface of the kayak. In alternative embodiments, and as shown in FIG. 7, the tensioning member can be inserted through a hole in the peg 228 to secure the tensioning member 320 to the peg 228.

The peg 228 is configured to be rounded and smooth to avoid catching on the camouflage covering or the hunter's clothing and accessories. In one embodiment, the peg 228 is configured to be permanently attached to the kayak. In some embodiments, the peg 228 contains holes to allow a tensioning member 320 to be inserted through a hole in the peg 228. An end of the tensioning member 320 can then be secured by either a knot, a clip, or a clamp to prevent the tensioning member from being pulled back through the hole in the peg 228. The pegs and connection points are present on both sides of the system 100, such that there are two first points 516 and two pegs 228, one on each side of the system. Therefore, the cord pulls vertically against the pegs 228 and provides tension to hold the camouflage covering 500 until the tension is released by the tension release mechanism 524.

In some preferred embodiments, multiple tensioning members 320 are present. In these embodiments, a first tensioning member 320A and a third tensioning member 320C may each extend from one of the pegs 228 of the kayak 200. The first and third tensioning members stretch upwards from the pegs 228 to their respective rod 304 within the camouflage covering 500. The tensioning members 320A and 320C each provide a downward pulling force against the rods 304A that pulls the rods toward the outer edge of the interior volume of the kayak. A second tensioning member 320B, extends between each of the rods 304 and/or the camouflage covering 500. This second tensioning member provides a pulling force on each of the rods that pulls the rod towards the opposite side of the kayak and counters the rotational moment created by the first and third tensioning members. When the user is ready to exit the blind, they simply loosen or release the second tensioning member 320B. When the second tensioning member is released, it no longer provides a resisting force to the first and third tensioning members, so the rods 304 are no longer supported by the tension in the second tensioning member. Thus, the first tensioning member pulls the first rod towards the kayak floor and the second tensioning member pulls the second rod towards the kayak floor. This ensures that the rods are quickly pulled straight down and do not obstruct the hunter while the hunter shoulders the firearm.

The second tensioning member 320B may attach to the rods 304 by a clip, a toggle, a knot, or any other suitable connection known in the art. Similarly, the second tensioning member may attach directly to the camouflage covering 500 rather than the rod 304 by a clip, a toggle, a knot, a loop, sewing, or any other means known in the art. In one preferred embodiment, an end of the second tensioning member 320B is inserted through openings near the edge of the covering and wraps around the covering 500 before extending back to a securing feature, such as a toggle or clamp. In some embodiments, the second tensioning member may be permanently attached to one side or to both sides of the camouflage covering. This can be achieved through sewing, adhesive, ties, or other attachment means known in the art. In these embodiments, a quick release button or toggle can be used to quickly release the tensioning member.

Preferably, the second tensioning member is attached to the first portion of the covering proximal to the tunnels or channels through which the rods 304 are inserted. The second section also extends from one side of the covering near the tunnel containing the rod 304. As such, the second tensioning member 320B must be positioned underneath the second section of the camouflage covering to ensure the blind may be released from inside the covering. The second section of covering therefore may extend from a point that is proximal to the tunnel. Preferably, the second section extends from a point that is proximal to the tunnel or channel housing the rod 304 but is positioned lower or distal from the opening than the tunnel and rod 304. This positioning ensures that the second section of covering will conceal the entire volume of the blind.

The tension release mechanism can take various forms, including a toggle button that securely holds a portion of the tensioning member, allowing for precise adjustment and rapid release when needed. Alternatively, a clip-style mechanism may be employed, offering a simple yet effective means of managing tension and facilitating swift deployment or collapse of the blind structure. The design flexibility extends to incorporate any suitable mechanism known in the art that can selectively release a length of cord, ensuring compatibility with different user preferences and hunting scenarios. Regardless of the specific form, the tension release mechanism is engineered to be easily accessible and operable by the hunter, even while maintaining a concealed position within the blind. This feature allows hunters to quickly transition from a hidden state to an active shooting position, maximizing their chances of success in dynamic hunting environments.

When the rods holding the blind are no longer supported by the tensioning member, the rods are able to rotate due to the anchor's multiple degrees of freedom and the pulling force from the other tensioning members. Specifically, the mount 408 and connector 412 of the anchors 400 are able to rotate about the body 404 to provide rotation and the connector 412 is able to pivot about pin 416 to allow the rod to be lowered without resistance. This freedom ensures that there is little resistance and the frame 300 can be quickly tossed without obstructing the hunter when shouldering the firearm. Further, as the rods are positioned to cross over each other and are only held up by the tensioning member, the rods 304 and the camouflage covering 500 falls to the outside of the opening, further ensuring that the hunter is not obstructed when exiting the blind.

The hunter preferably enters the kayak having the system installed and assumes a reclined seated position, as shown in FIG. 6. The hunter can then raise the rods 304 and adjust the tensioning mechanism to hold the rods 304 in the raised configuration. The camouflage covering 500 can then be put in position with the ties or other securing features 512 to hold the covering to the rods 304. Alternatively, if the rods are inserted within the tunnels of the covering, the camouflage covering 500 is raised and lowered with the rods 304. Preferably, the tensioning mechanism is permanently connected to the camouflage covering 500 and does not directly connect to the rods 304. When the hunter raises the rods 304, the camouflage covering 500 is raised into position and conceals the kayak and the majority of the hunter; however, there is still a gap between the rods 304 of the frame that is not concealed. Finally, the hunter can cover his head by draping a second section 508 of covering over the gap between the rods 304 to conceal the hunter's entire body and head. While in this configuration, the rods and camouflage covering are raised over the hunter's entire body and the entire volume of the kayak and the space between the kayak and the frame is concealed. Thus, a hunting dog and other equipment may be concealed along with the hunter.

As previously mentioned, the hunter may release the tensioning cable to lower the blind before shooting to exit the blind. In a preferred embodiment, the hunter will push the second section 508 of the covering towards the side that it extends from, ensuring that it falls outwards, away from the hunter, and does not impede the hunter when shouldering the firearm. The tensioning cables connected to each side of the camouflage covering pull the camouflage covering straight down when the center tensioning mechanism is released and no longer provides a resisting force to hold the rods 304 in the raised position. In some embodiments, the system 100 is configured such that the hunter drops the blind with their non-dominant hand to ensure a more fluid exit and shouldering movement.

Figure 8:
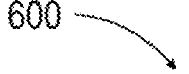
FIG. 8 shows an embodiment of the hunting blind mounting plate for use on the ground.
Figure 8:
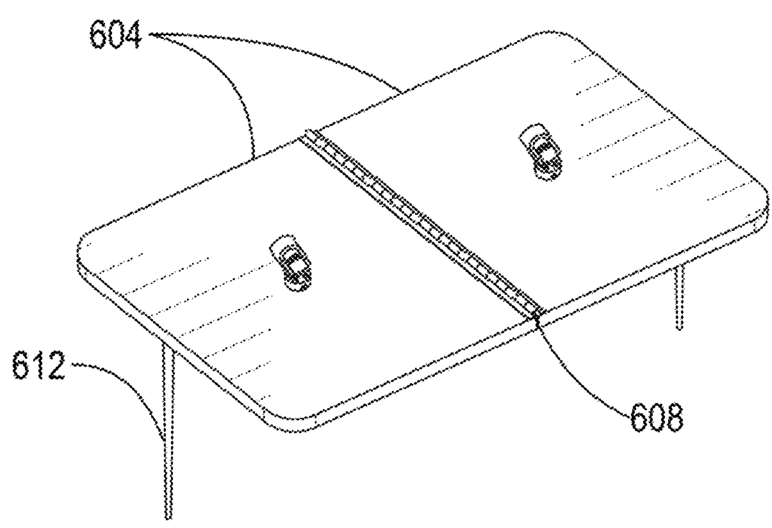
Figure 9:
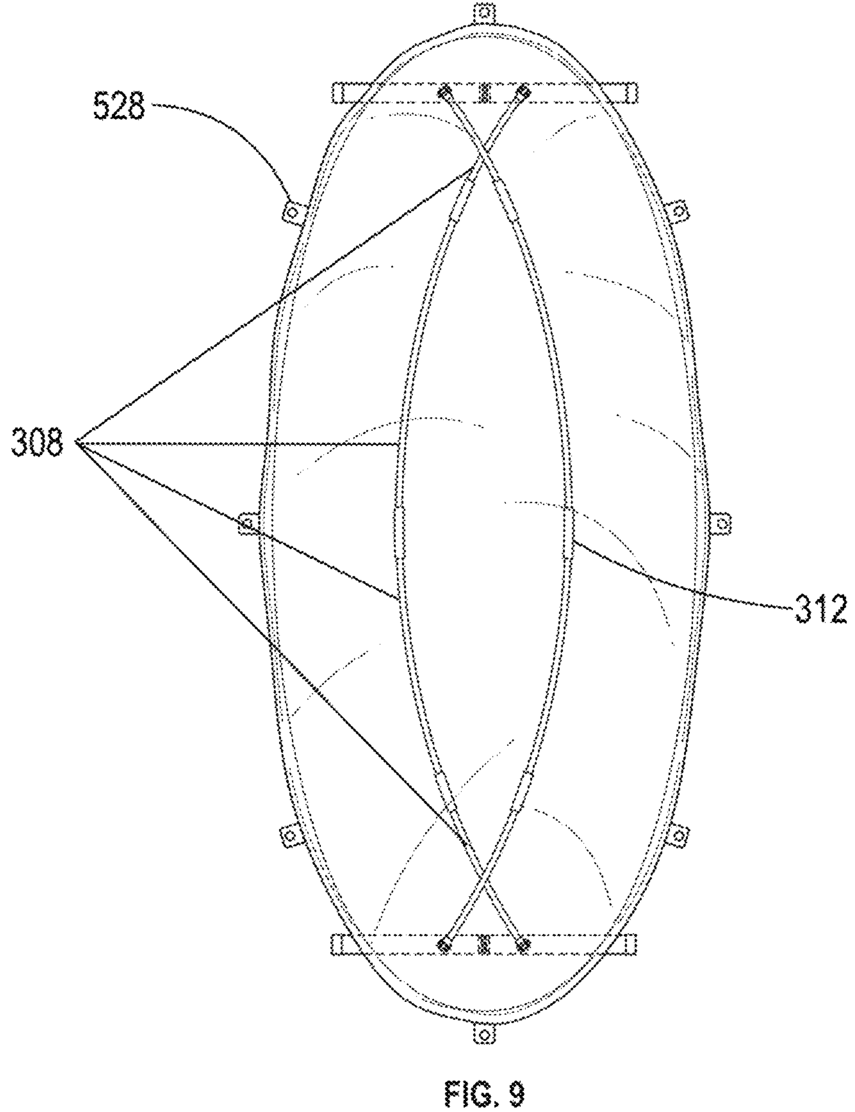
FIG. 9 shows an embodiment of the hunting blind mounted to the ground with the mounting plate depicted in FIG. 8.

The hunting blind system illustrated in FIGS. 8 and 9 presents an alternative configuration designed for ground-based deployment, offering versatility beyond the kayak-mounted version. This adaptation utilizes at least one mounting plate 600 to support the frame 300 and camouflage covering 500, creating a stable foundation for the blind structure. The mounting plate 600 incorporates anchors 400 similar to those described in previous embodiments, maintaining consistency in the overall design. These anchors are preferably engineered with at least two degrees of freedom, allowing rotation about the attachment point on the mounting plate and around an axis parallel to the plate's surface. This range of motion ensures flexibility in adjusting the blind's structure to accommodate various terrains and hunting scenarios. The dual-axis rotation capability of the anchors facilitates easy setup and takedown of the blind, enhancing its portability and adaptability to different hunting environments.

The mounting plate 600, as illustrated in FIG. 8, preferably features a generally flat, rectangular shape, though its design allows for variations such as oblong or square configurations to suit different needs. Constructed from rigid materials like metal or hard plastic, the plate provides a durable base for the blind structure. In some embodiments, wood or hard rubber may be used as alternative materials, offering different benefits in terms of weight, durability, or cost. A key feature of the mounting plate is its ability to be formed from multiple sections 604, connected by a hinge 608 typically positioned at the midpoint. This segmented design allows the plate to conform to uneven terrain, ensuring stability on various ground surfaces. The plate is secured to the ground using spikes 612 that protrude from its bottom surface, positioned opposite the anchors 400. These spikes may be removably attached, for example, using threaded connections or other suitable attachment methods, allowing for easy replacement or adjustment as needed.

Some preferred embodiments of the ground-mounted blind system, as shown in FIG. 9, employ two mounting plates 600, positioned at each end of the camouflage covering. This configuration provides enhanced stability and support for the blind structure. In these setups, each mounting plate 600 connects to both rods 304 via the anchors 400, creating a robust framework. The mounting plates are strategically positioned with the anchors spaced apart by a distance shorter than the length of the straight rods 304. This design necessitates the bending of the rods when attached to the anchors, creating an arched structure. The resulting bend in the rods generates a volume between the rods and the ground, forming the interior space of the blind. This arched configuration not only provides ample room for the hunter but also contributes to the overall stability and wind resistance of the structure.

The design of the ground-mounted blind ensures that the mounting plate is positioned beneath the camouflage covering. This arrangement allows the spikes to directly interface with the ground without interference from the covering 500, ensuring a secure anchoring of the blind. The rods 304 are designed to be firmly attached to the camouflage covering 500, enabling the covering to move in unison with the rods. This integration is typically achieved by inserting the rods into tubes or channels 520 along the perimeter of the camouflage covering, similar to the pole system used in modern tents. This method of attachment ensures that the covering maintains its shape and position relative to the frame, enhancing the blind's overall concealment effectiveness and ease of use.

The camouflage covering 500 used in the ground-mounted version, as depicted in FIG. 9, shares many similarities with the covering described in previous embodiments. However, it features an additional element: tabs 528 along its perimeter. These tabs are designed with holes that allow for the insertion of spikes or other securing mechanisms, providing a means to anchor the covering directly to the ground. This feature enhances the blind's stability in windy conditions and ensures a tight, gap-free fit between the covering and the ground surface. The ability to secure the covering at multiple points along its perimeter also allows for fine-tuning of the blind's shape and tension, optimizing its camouflage effectiveness in various terrains and weather conditions.

The operational principles of the ground-mounted blind mirror those of the kayak-mounted version, maintaining consistency in user experience across different deployment scenarios. A tensioning member spans between the covering near the two rods 304, which can be quickly released to lower the rods and collapse the blind structure. This rapid deployment mechanism is crucial for hunters who need to quickly transition from a concealed position to an active shooting stance. Additional tensioning members may be incorporated into the design, extending between the mounting plate 600 and the covering 500, or alternatively, connecting directly to the ground. These supplementary tensioning elements serve to pull the covering downward, ensuring a taut and well-shaped blind profile. The flexibility in tensioning options allows hunters to adapt the blind's configuration to specific environmental conditions or personal preferences, enhancing its versatility and effectiveness in various hunting scenarios.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

I claim:

1. A hunting blind system, comprising:

a frame having at least two flexible rods;

anchors configured to attach said flexible rods to an attachment base, wherein said anchors are spaced apart by a distance shorter than a length of said flexible rods such that said flexible rods bend outwards when attached to said anchors, wherein said anchors are attached to a deck of said recreational marine vehicle at a front end and a rear end;

a tensioning mechanism configured to hold the flexible rods in a raised position and selectively release the flexible rods to a lowered position, wherein said rods and said attachment base define an interior space; and a camouflage covering configured to be supported by said flexible rods, wherein said covering covers said interior space.

2. The hunting blind of claim 1, wherein said anchors are located at a first end of said attachment base and a second end of said attachment base, wherein said flexible rods are secured to said anchors located at said first end of said attachment base and said second end of said attachment base.

3. The hunting blind of claim 2, wherein said tensioning system holds said flexible rods in a way that create an opening into said interior space.

4. The hunting blind of claim 3, wherein said interior space includes a seating area positioned on a top surface of the anchor base.

5. The hunting blind system of claim 4, wherein said camouflage covering comprises:

a first section configured to cover said attachment base; and a second section configured to extend across said opening between said flexible rods.

6. The hunting blind system of claim 1, wherein said attachment base is a recreational marine vehicle.

7. The hunting blind system of claim 1, wherein said anchors comprise:

a body configured to attach to said attachment base;

a mount attached to said body; and a connector rotatably attached to said mount and configured to receive an end of one of said flexible rods.

8. The hunting blind system of claim 7, wherein said connector is configured to rotate about at least two axes relative to said body.

9. The hunting blind system of claim 1, wherein said tensioning mechanism comprises:

one or more first tensioning members connecting one or more of said flexible rods to said attachment base; and a second tensioning member extending between said flexible rods.

10. The hunting blind system of claim 9, wherein said second tensioning member is affixed to a tension release mechanism, wherein said tension release mechanism is configured to operate the selective release of said second tensioning member to lower said flexible rods.

11. A system for concealment from wildlife, comprising:

a skeleton having a plurality of flexible rods;

a water recreational vehicle;

anchors configured to attach said flexible rods to said water recreation vehicle, wherein said anchors are spaced apart by a distance shorter than a length of said flexible rods such that said flexible rods bend outwards when attached to said anchors, wherein said anchors are located at a first end of said water recreation vehicle and a second end of said water recreation vehicle, wherein said flexible rods are secured to said anchors located at said first end of said water recreation vehicle and said second end of said water recreation vehicle;

a tensioning system configured to hold the flexible rods in a raised position and selectively release the flexible rods to a lowered position, wherein said rods and said water recreation vehicle define an interior space; and a camouflage covering configured to be supported by said skeleton, wherein said covering covers said interior space.

12. The system of claim 11, wherein said tensioning system holds said flexible rods in a way that create an opening into said interior space.

13. The system of claim 11, wherein said anchors comprise:

a body configured to attach to said water recreation vehicle;

a mount attached to said body; and a connector rotatably attached to said mount and configured to receive an end of one of said flexible rods.

14. The system of claim 13, wherein said connector is configured to rotate about at least two axes relative to said body.

15. The system of claim 11, wherein said tensioning system comprises:

one or more first tensioning members connecting one or more of said flexible rods to said water recreation vehicle; and a second tensioning member extending between said flexible rods.

16. The system of claim 15, wherein said second tensioning member is affixed to a tension release mechanism, wherein said tension release mechanism is configured to operate the selective release of said second tensioning member to lower said flexible rods.

* * * * *